United States Patent

Guasch

[11] Patent Number: 5,117,705
[45] Date of Patent: Jun. 2, 1992

[54] RACK AND PINION ASSEMBLY

[75] Inventor: Esteve C. Guasch, Mataro Barcelona, Spain

[73] Assignee: Bendix Espana S.A., Barcelona, Spain

[21] Appl. No.: 702,571

[22] Filed: May 20, 1991

[30] Foreign Application Priority Data

Jun. 28, 1990 [ES] Spain ................... 90 01780

[51] Int. Cl.⁵ .......................................... F16H 1/04
[52] U.S. Cl. .......................................... 74/422; 74/498
[58] Field of Search ................................ 74/422, 498

[56] References Cited

U.S. PATENT DOCUMENTS

| 3,592,075 | 7/1971 | Clark | 74/498 |
| 4,215,591 | 8/1980 | Bishop | 74/422 |
| 4,263,817 | 4/1981 | Taig | 74/422 |
| 4,271,716 | 6/1981 | Carduner | 74/422 |
| 4,296,641 | 10/1981 | May | 74/422 |
| 4,369,669 | 1/1983 | Allen | 74/422 |
| 4,448,088 | 5/1984 | Adams | 74/498 X |

Primary Examiner—Allan D. Herrmann
Assistant Examiner—David W. Laub
Attorney, Agent, or Firm—Larry J. Palguta; Ken C. Decker

[57] ABSTRACT

The assembly comprises a rack (2) and a pinion (1) each having an axis of symmetry (7, 8) perpendicular to each other in their transversal section. The rack (2) is located in a chamber (6) provided within a rigid body (5), this chamber (6) having a partly cylindrical inner wall (9), the axis of symmetry of the chamber (6) being merged into the rack axis (8). The track (2) includes a front face engaged with the pinion (1) and a rear face opposite the front face, this rear face comprising two lateral tapered sides (15) converging toward the rack axis (8) and an extending rib (13) having flat lateral sides (17) parallel to the rack axis. Within the rigid body (5), is provided a pair of members (31, 32) disposed symmetrically with respect to the rack axis (8), each member (31, 32) being rotatively slideable along the cylindrical inner wall (9), each of the members engaging one of the lateral tapered sides (15) at about one point and one of the lateral flat sides (17) at about one point, and further including a spring (4) located between ends of the members (31, 32) and urging the ends in opposite directions in such a way that the members (31, 32) bear on the rib (13) to generate an anti-ungearing force applied to the lateral tapered sides (15) of the rack (2).

9 Claims, 1 Drawing Sheet

RACK AND PINION ASSEMBLY

BACKGROUND OF THE INVENTION

This invention relates to rack and pinion assemblies and more particularly, to a rack and pinion assembly having enhanced anti-ungearing means.

This rack and pinion assembly is particularly designed for motor vehicles steering gears, but is not limited to such a use.

This type of rack and pinion assembly is well known in the art. For instance, document GB-A-2 188 119 of discloses such an assembly having a rack chamber of triangular shape, the rear face of the rack having a partly complementary triangular shape. A wedge biased by a spring between a chamber wall and a side of the rear face of the rack improves contact between rack and pinion elements, while the other side of the rear face of the rack and another chamber wall are engaged in order to guide the rack.

GB-A-976 661 of also a rack having a rear face triangularly shaped, a spring urging a shoe of complementary shape to hold the teeth of the rack in proper mesh with the teeth of the pinion.

SUMMARY OF THE INVENTION

One object of the invention is a rack and pinion assembly of reduced manufacturing costs, having enhanced anti-ungearing means.

Another object of the invention is a rack and pinion assembly of reduced friction between the anti-ungearing means, the rack guiding means and the rack itself.

Accordingly, the invention relates to a rack and pinion assembly, in which the rack and the pinion have each an axis of symmetry perpendicular to each other in their transversal section. The assembly further comprises, within a rigid body, means for guiding the rack and for maintaining engagement between the rack and the pinion.

According to the invention, the rack is located in a chamber provided within the body together with said means, the chamber having a partly cylindrical inner wall, the axis of symmetry of the chamber being merged into the rack axis; moreover, the rack includes a front face engaged with the pinion and a rear face opposite the front face, this rear face comprising two lateral tapered sides converging toward the rack axis and an extending rib having flat lateral sides parallel to the rack axis; furthermore said means includes a pair of members disposed symmetrically with respect to the rack axis, each member being rotatively slideable along the cylindrical inner wall each of the members engaging one of the lateral tapered sides on about one point and one of the lateral flat sides on one point, and further includes a resilient means located between ends of the members urging same in opposite directions in such a way that the members bearing on the rib generate an anti-ungearing force applied to the lateral tapered sides of the rack.

Preferingly each member is substantially V-shaped, the point of which is engaged with one of the flat lateral sides of the rib, a first arm being engaged with one of the lateral tapered sides, and the end of the second arm being biased by the resilient means, the ends of the two arms being engaged with the inner wall of the chamber.

BRIEF DESCRIPTION OF THE DRAWINGS

Other features of the invention will appear from the following detailed description of some preferred embodiments given on a non-limiting way with reference to the accompanying drawing in which.

DETAILED DESCRIPTION OF THE INVENTION

Figure 1:
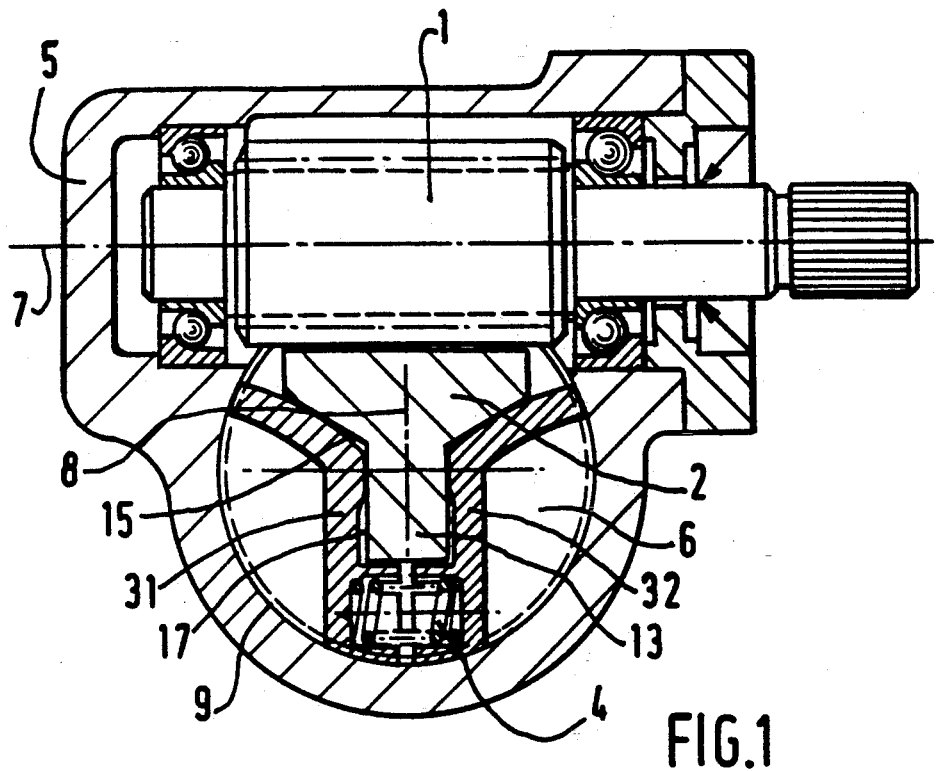
FIG. 1 is a diagrammatic cut view of a preferred embodiment of the invention.

With reference now to the Figures, the skilled man will recognize FIG. 1 a rack and pinion assembly. Pinion 1 has an axis of symmetry 7 which is perpendicular to the axis of symmetry 8 of the transversal section of the rack 2. The assembly is located within a body 5 which defines a chamber 6 where is located the rack 2 and means for guiding the rack and maintaining a proper engagement between the teeth of the rack 2 and the teeth of the pinion 1.

This chamber 6 has an inner wall partly cylindrical 9, and its axis of symmetry merges into the rack axis 8.

The rack 2 comprises a front face having teeth meshing with the pinion teeth, and a rear face opposite to the front face. This rear face comprises two lateral tapered sides 15 converging toward the rack axis 8, and an extending rib 13 having flat lateral sides 17 parallel to the rack axis 8.

The means for guiding the rack 2 and for maintaining the engagement of the teeth of the assembly comprises two members 31, 32 symmetrical with regard to the rack axis 8, and a resilient means 4. Each member 31, 32 is substantially V-shaped, the end of each arm of the V being rotatively slideable along the inner cylindrical wall 9 of the chamber 6. The point of the V engages one of the lateral flat sides 17 of the rib 13 on about one point. One arm (the upper one on the Figure) engages one of the lateral tapered sides 15 of the rear face of the rack 2 one about one point. Accordingly, as shown on FIG. 1 this arm is curved. The other arm of the V is urged by a resilient means 4. As shown, this resilient means is a helical spring the axis of which is perpendicular to the rack axis 8.

The assembly operates as follows: the forces generated by the prestressed spring 4 urge the two members 31,32 in opposite directions. Since these members may rotate along the inner wall 9, the point of each V bears on one flat lateral side 17 of the rib 13 for generating a force on the other arm of the V which is applied to the lateral tapered side 15 of the rack 2. Consequently, at the same time, the rack is guided thanks to the rib 13 and the teeth remain meshed thanks to this force.

In other words, each member 31, 32 acts as a lever the fulcrum of which ensures the guiding of the rack.

Figure 2:
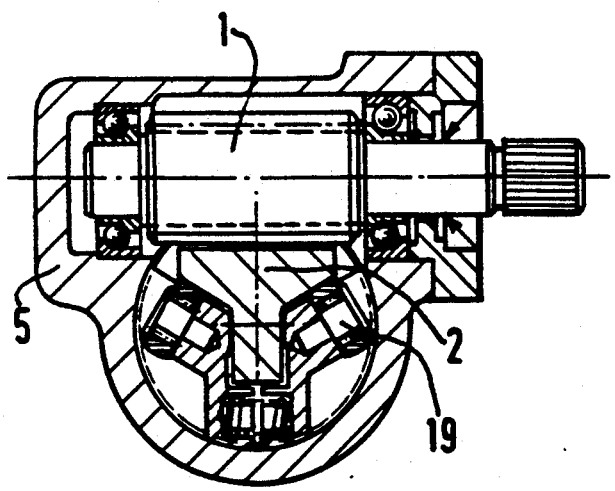
FIG. 2 shows another embodiment of the invention.

FIG. 2 shows another embodiment of the assembly where the upper arm of the V is not curved but bears rollings 19 in order to decrease the friction resistance. This assembly operates as abovementioned.

Figure 3:
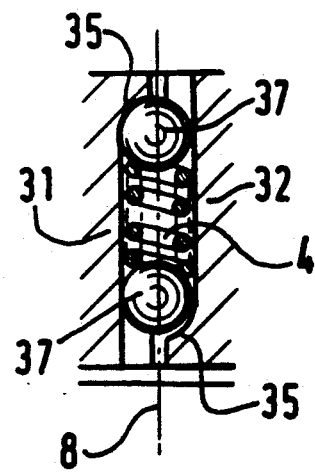
FIG. 3 is an enlarged cut view of a part of another embodiment of the invention.

FIG. 3 shows an enlarged view of another kind of resilient means for urging the members 31, 32 in opposite directions. The ends of the members 31, 32 are provided with slope ramps 35 cooperating with balls 37. A spring 4 the axis of which merges into the rack axis 8, biases two balls respectively up and down against the ramps in order to provide the required forces separating the ends of the members 31, 32.

Obviously, one skilled in the art will bring many deviations and enhancements to the rack and pinion assembly of the invention without departing from the scope of the invention.

For instance, other kinds of resilient means 4 may be used, as leaf springs, elastomeric materials, or equivalent. Any kind of rollings 19 may be operated to exercise the function of engagement on one point with the lateral tapered side 15 of the rear face of the rack 2.

Each member has been said to be substantially V shaped. But other similar shapes may be used in order to achieve a lever bearing on the rib 13 for applying a force to the rack opposite to the anti-meshing force generated by the teeth. FIG. 3, balls 35 are used as spacing means however, other kinds of spacing means, e.g. wedges, may also be used.

What we claim is:

1. A rack and pinion assembly, said rack and said pinion each having an axis of symmetry perpendicular to each other in transversal section, said assembly further comprising within a rigid body, means for guiding said rack and for maintaining engagement between said rack and said pinion, characterized in that the rack is located in a chamber provided within said body together with said guiding means, said chamber having a partly cylindrical inner wall, ann axis of symmetry of said chamber being merged into the rack axis, said rack including a front face engaged with said pinion and a rear face opposite the front face, the rear face comprising two lateral tapered sides converging toward said rack axis and an extending rib having flat lateral sides parallel to said rack axis, said guiding means including a pair of members disposed symmetrically with respect to the rack axis, each member being rotatively slideable along said cylindrical inner wall, each of said members engaging one of said lateral tapered sides at about one point and one of the lateral flat sides at about one point, and further including resilient means located between ends of said members and urging said ends into opposite directions in such a way that said members bear on the rib to generate an anti-ungearing force applied to the lateral tapered sides of said rack.

2. The rack and pinion assembly according got claim 1, wherein each of said members is substantially V-shaped and a point of which is engaged with one of said flat lateral sides of the rib, a first arm being engaged with one of said lateral tapered sides, and an end of a second arm being biased by resilient means, and ends of the two arms being engaged with said inner wall of said chamber.

3. The rack and pinion assembly according to claim 2, wherein a surface of said first arm engaged with said lateral tapered side is curved.

4. The rack and pinion assembly according to claim 2, wherein said first arm includes rolling means engaging said lateral tapered side.

5. The rack and pinion assembly according to claim 1, wherein said resilient means consists of a helical spring.

6. The rack and pinion assembly according to claim 5, wherein an axis of said helical spring is perpendicular to said rack axis.

7. The rack and pinion assembly according to claim 5, wherein an axis of said helical spring merges into said rack axis, an end of each member being provided with a sloped ramp where at least one spacing means slides, said spring biasing said spacing means.

8. The rack and pinion assembly according to claim 7, wherein said spacing means consists of a ball.

9. The rack and pinion assembly according to claim 7, wherein said spacing means consists of a wedge.

* * * * *